(No Model.) 2 Sheets—Sheet 1.

J. H. SWIHART.
SPRING BALANCE COMPUTING SCALE.

No. 539,599. Patented May 21, 1895.

WITNESSES:
Lester L. Allens
A. J. Fiorini

INVENTOR
J. H. Swihart
BY
R. J. McCaily
ATTORNEY.

(No Model.) 2 Sheets—Sheet 2.

J. H. SWIHART.
SPRING BALANCE COMPUTING SCALE.

No. 539,599. Patented May 21, 1895.

WITNESSES:
Lester L Allen
A J Tirini

INVENTOR
J. H. Swihart
BY
R. J. M'Carty,
ATTORNEY.

THE NORRIS PETERS CO., PHOTO-LITHO., WASHINGTON, D. C.

UNITED STATES PATENT OFFICE.

JOHN HENRY SWIHART, OF DAYTON, OHIO.

SPRING-BALANCE COMPUTING-SCALE.

SPECIFICATION forming part of Letters Patent No. 539,599, dated May 21, 1895.

Application filed October 26, 1894. Serial No. 527,095. (No model.)

*To all whom it may concern:*

Be it known that I, JOHN HENRY SWIHART, of Dayton, county of Montgomery, State of Ohio, have invented a new and useful Improvement in Spring-Balance Computing-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in spring-balance scales, and is preferably to be used in connection with a calculating dial, upon which are placed in novel arrangement, numerals designating weight in pounds and ounces, and money value of various quantities of goods or articles sold.

The invention has for its object the further improvement of the spring-balance scale shown and described in my application for United States Letters Patent, filed June 4, 1894, Serial No. 513,487; and to this extent provides a reading dial upon which the numerals are placed in such a manner as to preclude the possibility of confusion in reading them, and further, provides devices interposed between the shaft upon which said dial is mounted, and the sliding bars, whereby the sudden vibrations or shocks ordinarily transmitted to the scale when a load is placed thereon or taken off, will be lessened to such an extent as to not interfere with the successful operation and durability of the scale.

A further object is to provide means for compensating for tare weight, or the weight of the article or receptacle in which the commodity is placed, as distinct from the commodity itself.

To the attainment of the foregoing ends, the improvements have reference to parts that will be fully described in the specification, taken in connection with the drawings hereto annexed, of which—

Figure 1:
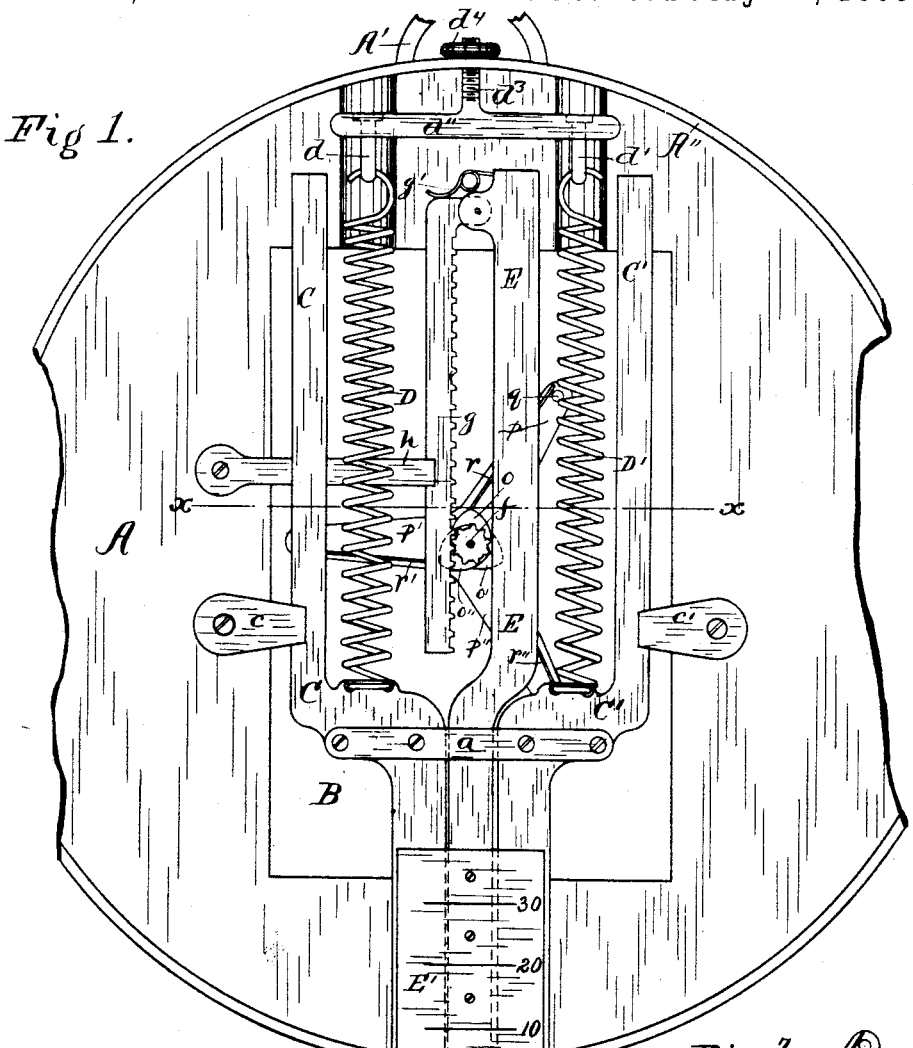
Figure 2:
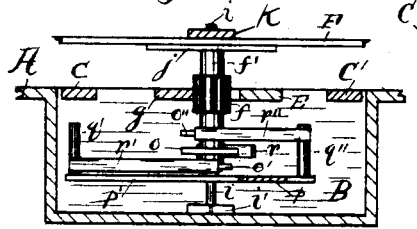
Figure 3:
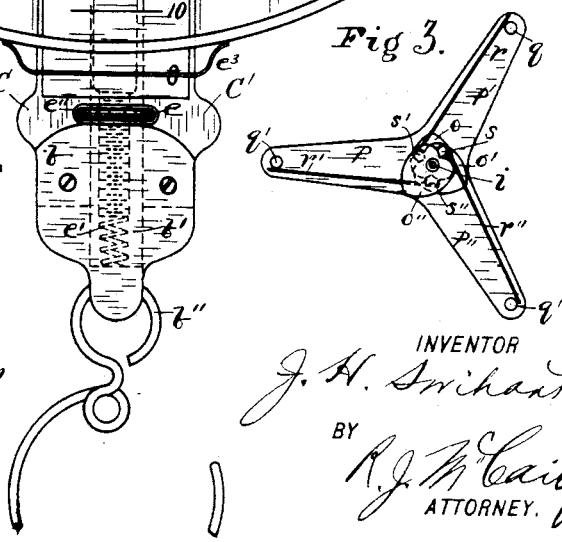
Figure 4:
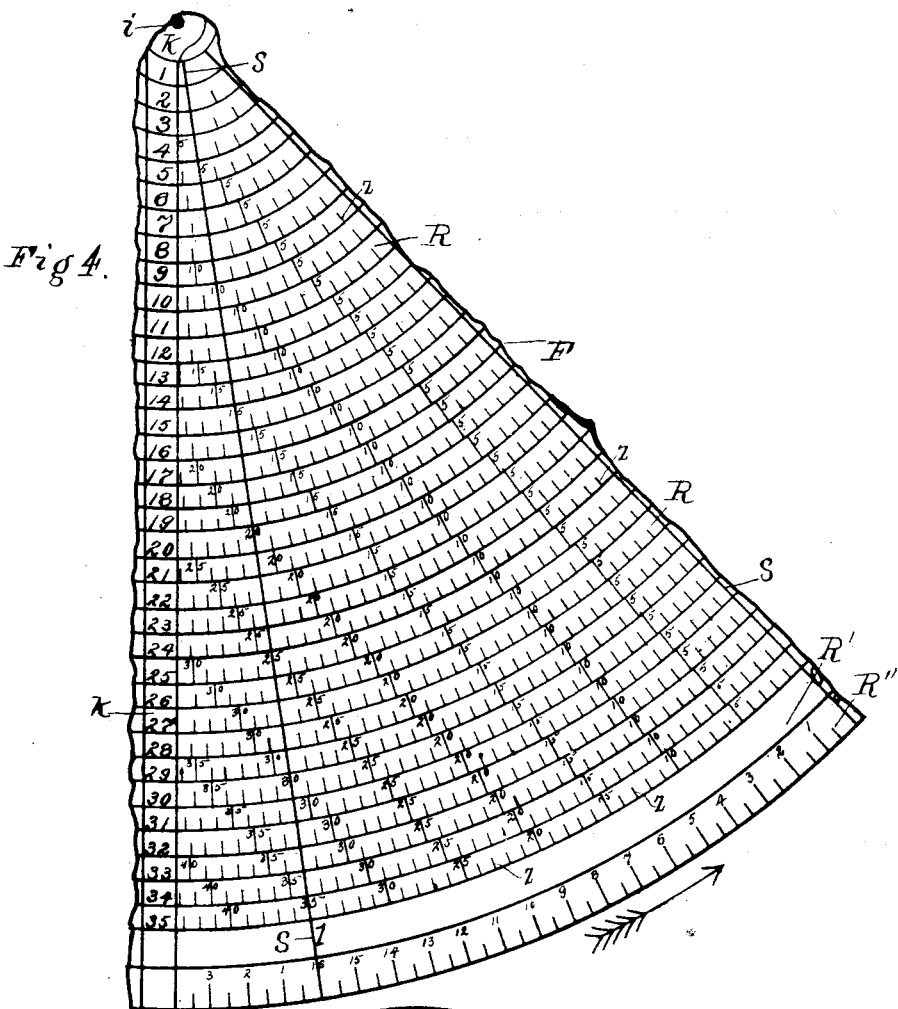
Figure 5:
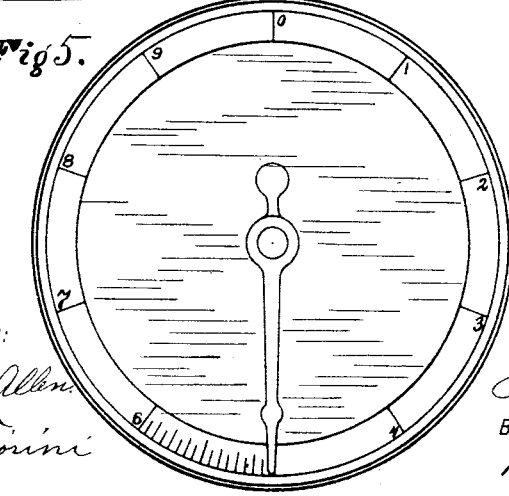

Figure 1 is a front elevation of the supporting-plate, the calculating-dial removed in order to exhibit the operating devices; Fig. 2, a section on the line $x\,x$ of Fig. 1, the springs not appearing; Fig. 3, a detached detail plan view of the triple arm-plate, springs thereon, and the heart-cams; Fig. 4, a segment of the calculating-dial and the price-per-pound scale, showing their relative positions; Fig. 5, a front elevation showing a common form of pound-and-ounce dial, with an index-hand that may be used in connection with the actuating mechanism.

The same letters of reference will be used on corresponding parts in the several views.

The letter (A) designates a metallic supporting plate provided with the usual suspension ring or loop (A'). (B) designates a recess in the central portion of said plate, preferably rectangular to afford desirable space for the devices that are located therein.

(C)—(C') designate sliding bars maintained in relative positions by transverse plates ($a$) of which there is one on either side of said bars. The lower ends of these bars are rigidly mounted in a socket plate ($b$), with an intervening opening ($b'$) therein.

($b''$) designates the supporting hook attached to the socket plate ($b$) and upon which it is customary to place a scale pan. (Not shown.)

($c$)—($c'$) designate stays attached to the plate (A) and loosely inclosing the outer sides of the sliding bars (C)—(C'). These stays are chiefly useful in protecting the more delicate mechanism from injury during the shipment of the scales.

(D)—(D') designate coil springs the ends of which are attached to a central part of the bars (C)—(C'), and to eyes ($d$)—($d'$) projecting from a transverse bar ($d''$) having a screw threaded stem ($d^3$) engaging with an opening in the annular flange (A'') of the supporting plate. This stem is provided with a thumb nut ($d^4$), and by means of these devices a very minute adjustment of the coil springs D and D' may be had to take up any looseness of said springs that may arise from usage.

(E) designates an intermediate sliding bar mounted between the plates ($a$), and the sliding bars (C)—(C'). The lower end of this bar (E) is decreased in diameter; screw threaded, and enters the opening ($b'$) in the socket plate ($b$).

($e'$) designates a coil spring seated in the lower extremity of the opening ($b'$) upon which the bar (E) normally rests, see Fig. 1, wherein the opening ($b'$) and spring ($e'$) appear in dotted lines. (*e*) designates a thumb nut on the screw threaded end of said bar. The edges of this nut project from the slot (*e″*) in which it moves, on either side of the bars (C)—(C′), and it may be turned by the fingers to adjust the position of the bar (E) to a lower or higher plane, independently of the bars (C)—(C′).

(E′) designates a plate attached to the bar (E) which bears numerals "10," "20" and "30" designating one, two and three revolutions of the dial by means of which the capacity of the scale is increased to this extent.

($e^8$) designates an index bar in alignment with the zero mark on the plate (E′) showing the normal position of the sliding bars and dial.

(*g*) designates a rack bar pivoted to the upper end of the bar (E), and (*f*) is a pinion with which said rack meshes, and is kept in gear therewith by a spring (*g′*) mounted on the upper end of the bar and pressing on said rack.

(*h*) is a guide stay rigidly attached to the supporting plate and also inclosing the outer edge of the rack serving to keep the rack in close proximity with the pinion. In practice it is preferable to place this guide stay on a horizontal plane with the pinion (*f*).

The pinion (*f*) is an integral part of a sleeve (*f′*) which is revolubly mounted on the shaft (*i*), the respective ends of which are journaled in a bearing plate (*i′*) on the inner side of the plate (A), and the bar (*k*) upon which are placed the numerals indicating the prices per pound. This scale or bar (*k*) is mounted in a similar manner to the mounting of that shown and described in the pending application hereinbefore referred to, but is read in a vertical position instead of the horizontal.

(*j*) designates a metallic plate rigidly mounted on the outer end of the shaft (*i*). The calculating dial (F) is fixed to this plate, therefore revolves with said shaft on the inside of the price per pound indicating bar.

Upon the inner end of the pinion sleeve there are rigidly mounted a plurality of heart cams to the number of three, indicated by (*o*)—(*o′*)—(*o″*), one above the other as shown in Fig. 2, and occupying radial positions shown in Figs. 1 and 2.

On the inner end of the shaft (*i*) adjacent to the inner end of the pinion sleeve, there is rigidly mounted a plate having a plurality of radial arms (*p*)—(*p′*)—(*p″*) provided with pins (*q*)—(*q′*)—(*q″*) upon which are mounted horizontally, a corresponding number of resilient bars or springs (*r*)—(*r′*)—(*r″*). These springs project inwardly, and have on their inner ends pins or lugs (*s*)—(*s′*)—(*s″*) that normally rest against the peripheries of the cams. The functions of these cams and adjunctive devices are to co-operate in revolving the calculating dial to the proper position to show the value of the article or commodity sold, when a sudden movement or jerk is imparted to the sliding bars by placing the load quickly upon the scale pan. It is important that the dial be not subjected to these sudden vibrations, yet be allowed to share in the common movement of the parts when jerks or sudden vibrations are not imparted to the primary movable parts. Therefore the strength of the spring bars (*r*)—(*r′*)—(*r″*) is sufficient, when the pins (*s*)—(*s′*)—(*s″*) are in the notched portion of the cams, to revolve in unison with the pinion sleeve; but at such time as a sudden movement turns said pinion sleeve, the pins draw out of said notches, and leave the shaft (*i*), spring bars, and dial to follow in their rotation, under the tension of said spring bars.

The functions of these devices are not changed from those functions shown and described in my pending application hereinbefore referred to. In the present invention, however, I equalize more thoroughly the pressure that is brought to bear between the pinion sleeve and the dial shaft, by employing three cams equi-distant apart, and thereby obtain a more positive movement of the dial in moving simultaneously with the pinion sleeve, or in moving independently thereof; and again, by mounting the spring-supporting plate upon the shaft, and the cams upon the pinion sleeve, said sleeve is thereby relieved of that much weight and resistance, and the springs are not controlled directly by the movement of said pinion sleeve. The result is, the dial is still further protected from any sudden jars that might be transmitted to the pinion sleeve by the causes herein before stated.

The calculating dial (F) has thirty five concentric lines (R) containing numerals showing the value of each quantity of goods sold. Inclosing these lines are two outer concentric lines (R′)—(R″) containing numerals indicating pounds and ounces, from zero up to ten pounds. These concentric lines are divided by a series of radial lines (S) which extend from the axis to the circumference of the dial and constitute the dividing lines by which the segmental spaces for each pound, and the fractional parts thereof, and the valuations, are obtained. The inner concentric lines (R) are stepped off by indices (*z*) each of which represents one cent. Every five of said indices are designated by the numerals "5," "10" "15" and so on in numerical progression. These indices or marks (*z*) as will be noted, increase in number with the enlargement of each successive concentric line, and are brought in alignment with the price per pound scale (*k*) by the mechanism hereinbefore described. The reading of the dial in connection with the scale (*k*) is not troublesome owing to this arrangement of the figures. The commodity sold, being placed on the scale pan, the dial instantly revolves and brings the various indices and numerals thereon in alignment with and adjacent to the numerals on the price per pound scale (*k*).

For example, one pound and four ounces of butter at thirty two cents per pound will cost forty cents. The tare or weight of the crock or other receptacle in which the butter is placed can be taken off by turning the thumb nut (e) to elevate or restore the sliding bar (E) and dial F to zero. This of course is done before the commodity is placed in said crock.

In Fig. 5, I have illustrated an ordinary pound and ounce dial with a pointer thereon, that may be used with satisfactory results in connection with the mechanism described in the foregoing specification, in which instance the pointer is fixed to the shaft (i) in place of the calculating dial.

Having fully described my invention, I desire to claim—

1. The combination of spring-controlled sliding bars, two of which are movable together; an intermediate sliding bar, movable with said bars or independently thereof; a rack bar carried by said intermediate sliding bar; a pinion and shaft rotated by said rack bar; and means for adjusting said intermediate sliding bar, to take off tare, substantially as described.

2. The combination of spring-controlled sliding bars; the adjustable transverse bar (d''); to which said springs are attached; a thumb nut for adjusting said bar (d''); an intermediate sliding bar movable with the before-mentioned sliding bars or independently thereof; a rack bar carried by said intermediate bar; a pinion and shaft rotated by said rack bar, and means for adjusting said intermediate bar to take off tare, substantantially as described.

3. The combination of spring-controlled sliding bars; a rack bar pivoted to one of said bars; a pinion sleeve movable by said rack bar; cams mounted on, and a shaft inclosed by said pinion sleeve; springs carried by said shaft that normally rest against the peripheries of said cams, substantially as described.

4. The combination of spring-controlled sliding bars; a shaft with a calculating dial as herein described, and springs mounted thereon; a pinion sleeve with cams thereon, with which said springs normally engage; and a rack bar pivoted to one of said sliding bars, and means for taking off the tare, substantially as described.

5. The combination of a price and weight indicating dial as described; a vertically positioned price per pound scale adjacent thereto; a shaft upon which said dial is fixed; and springs mounted on said shaft; a pinion sleeve, and cams fixed thereto, and means for rotating said pinion sleeve, substantially as described.

6. The combination of sliding bars, two of which have a fixed connection at their lower ends, and one of which is movable with said two or independently thereof; a rack bar pivoted to said independently movable bar; a plurality of cams fixed to, and a shaft loosely inclosed by said pinion sleeve; a plurality of springs carried on said shaft, and normally pressing said cams, substantially as described.

7. The combination with the supporting plate; of a plurality of sliding bars, two of which are inseparably movable, and one of which is movable with said two or independently thereof to take off tare; springs attached to two of said bars, and means for adjusting said springs to preserve a normal tension thereof; a rack bar pivoted to said independently movable sliding bar; a pinion sleeve movable by said rack bar; a shaft inclosed by said pinion sleeve, and means on said shaft and pinion sleeve for causing a uniform or independent movement of said parts, substantially as described.

8. The combination of sliding bars (C)—(C'); socket plate (b) to which said bars are attached; an intermediate sliding bar (E) having its lower end screw threaded and inserted in an opening (b') in said socket plate; a coil spring seated in said opening upon which the bar (E) normally rests; a thumb nut to elevate or lower the bar (E) to zero; a calculating dial, and means interposed between said dial and the bar (E) for moving said dial in unison with the bar (E) or independently thereof, substantially as described.

9. In a price computing scale, a dial upon which are indicated in circumferential columns, prices ranging from cents to dollars; and weights ranging from ounces to pounds; in combination with a shaft upon which said dial is rigidly mounted; spring bars carried by said shaft; a pinion sleeve inclosing said shaft, and upon which a plurality of cams are mounted against the peripheries of which, said spring bars normally press; a rack by which said pinion sleeve is rotated; and a sliding bar to which said rack is pivoted, and means for adjusting said sliding bar to relieve the scale of tare, substantially as described.

In testimony whereof I have hereunto set my hand this 19th day of October, 1894.

JOHN HENRY SWIHART.

Witnesses:
CHARLES A. HOYT,
R. J. MCCARTY.